US011630761B2

(12) United States Patent
Hartwell et al.

(10) Patent No.: US 11,630,761 B2
(45) Date of Patent: Apr. 18, 2023

(54) METHODS, SYSTEMS, AND MEDIA FOR GENERATING TEST AUTHORIZATION FOR FINANCIAL TRANSACTIONS

(71) Applicant: Capital One Services, LLC, McLean, VA (US)

(72) Inventors: Andrew Troy Hartwell, Prosper, TX (US); Neeraj Sharma, Glen Allen, VA (US); Suresh Vadigi, Kennett Square, PA (US); Siwatm Piyasirisilp, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/183,598

(22) Filed: Feb. 24, 2021

(65) Prior Publication Data
US 2022/0269590 A1   Aug. 25, 2022

(51) Int. Cl.
*G06F 11/36* (2006.01)
*G06Q 20/40* (2012.01)

(52) U.S. Cl.
CPC ...... *G06F 11/3684* (2013.01); *G06F 11/3612* (2013.01); *G06F 11/3696* (2013.01); *G06Q 20/401* (2013.01)

(58) Field of Classification Search
CPC .............. G06Q 20/401; G06F 11/3684; G06F 11/3696; G06F 11/3612
See application file for complete search history.

(56) References Cited

U.S. PATENT DOCUMENTS

| | | | |
|---|---|---|---|
| 8,069,106 B2 | 11/2011 | Waelbroeck et al. | |
| 8,738,704 B2 | 5/2014 | Stark et al. | |
| 8,904,239 B2 | 12/2014 | Seren et al. | |
| 9,965,758 B2 | 5/2018 | Zaidi et al. | |
| 10,181,120 B1 | 1/2019 | Holmes et al. | |
| 10,204,380 B1 * | 2/2019 | Moore | G06Q 40/12 |
| 10,225,330 B2 | 3/2019 | Palladino et al. | |
| 10,339,513 B1 | 7/2019 | Walters et al. | |
| 10,592,876 B2 | 3/2020 | Florimond | |
| 10,606,565 B2 | 3/2020 | Douglas et al. | |
| 10,628,420 B2 | 4/2020 | Devine et al. | |

(Continued)

FOREIGN PATENT DOCUMENTS

WO     2017187207 A1    11/2017

OTHER PUBLICATIONS

Enhanced Batch Processing in RITS—Jan. 2020 4. Settlement-Only Batch, Reserve Bank of Australia [online], Jan. 2020 [rtrv'd Sep. 24, 2022], Rtrv'd from Internet: <URL: https://www.rba.gov.au/payments-and-infrastructure/rits/information-papers/enhanced-batch-processing-in-rits/settlement-only-batch .html>, pp. 1-8.

*Primary Examiner* — Wei Y Zhen
*Assistant Examiner* — Amir Soltanzadeh

(57) ABSTRACT

The present disclosure is directed to systems, media, and methods of generating test authorization for financial transactions. One or more computing devices generate an initial data set corresponding to a financial transaction. Alterations to one or more fields of information included in the initial data set are made responsive to instructions received via a user interface. Responsive to the alterations, the one or more computing devices: convert the test data set into a binary file, deserialize the binary file, and generate a transaction file for the financial transaction based on the deserialized test data set.

19 Claims, 11 Drawing Sheets

(56) References Cited

U.S. PATENT DOCUMENTS

| | | | |
|---|---|---|---|
| 2006/0168513 A1* | 7/2006 | Coulson | G06F 40/149 |
| | | | 715/234 |
| 2012/0059882 A1 | 3/2012 | Stark et al. | |
| 2013/0254376 A1* | 9/2013 | Kudikala | H04L 67/22 |
| | | | 709/224 |
| 2017/0249622 A1* | 8/2017 | Ortiz | G06Q 20/387 |
| 2017/0293902 A1 | 10/2017 | Florimond | |
| 2018/0046939 A1* | 2/2018 | Meron | G06Q 20/405 |
| 2018/0081787 A1 | 3/2018 | Riddick et al. | |
| 2018/0144276 A1* | 5/2018 | Neravati | G06Q 10/063 |
| 2018/0349134 A1 | 12/2018 | Studer et al. | |
| 2019/0068622 A1 | 2/2019 | Lin et al. | |
| 2019/0141006 A1 | 5/2019 | Schnitt | |
| 2019/0278637 A1* | 9/2019 | Sukhija | H04L 67/02 |
| 2020/0152297 A1 | 5/2020 | Freeburg, II et al. | |
| 2022/0188828 A1* | 6/2022 | Lu | G06Q 20/4016 |

* cited by examiner

METHODS, SYSTEMS, AND MEDIA FOR GENERATING TEST AUTHORIZATION FOR FINANCIAL TRANSACTIONS

BACKGROUND

The societal move away from cash transactions and toward electronic/online purchases has automated a number of processes involved in payments. Just as importantly, the migration to electronic transactions as the customary method of payment has also introduced additional layers of complication, increased the number of actors involved in the process, and increased the opportunity for fraud. In the previous era of in-person, cash transactions, a consumer merely needed to locate a store clerk. The transaction was completed more or less immediately (with the exception of any time standing in a line for the clerk) and with little to no opportunity for fraud (i.e., the rare instances of counterfeit currency notwithstanding).

As a result of electronic payment developments, typically transactions now are bifurcated. Payment entails both credit/debit card authorizations that occur at the point of sale or on a web site, as well as settlements that are resolved in the hours to days subsequent to the transaction. The distinction is intuitive for anyone who has noted the delay that occurs between completing a purchase (i.e., the transaction authorization) and the date such authorization actually posts to an account as a finalized transaction (i.e., the settlement).

While both credit card authorizations and settlements can ultimately be processed by the same vendor (though not necessarily), the information exchanged, the data formats used, and other important details to complete each process are different. For developers who implement code enabling web sites and other electronic processing means, each aspect of the payment process must be addressed. Depending on the process, these differences may be painstakingly detailed, buried in the minutiae of machine-readable code (e.g., binary or other forms not readable by developers), or involve long strings of data. Put another way, code development is hampered not by simplistic conversions remedied by an easily implemented macro, but by complex interactions between varied and disparate files, formats, and even processing entities.

Accordingly, systems, methods and media are needed to simplify the overall coding development framework and to enable testing in a microservices environment for payment processes.

BRIEF DESCRIPTION OF THE DRAWINGS

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

DETAILED DESCRIPTION

Figure 1:
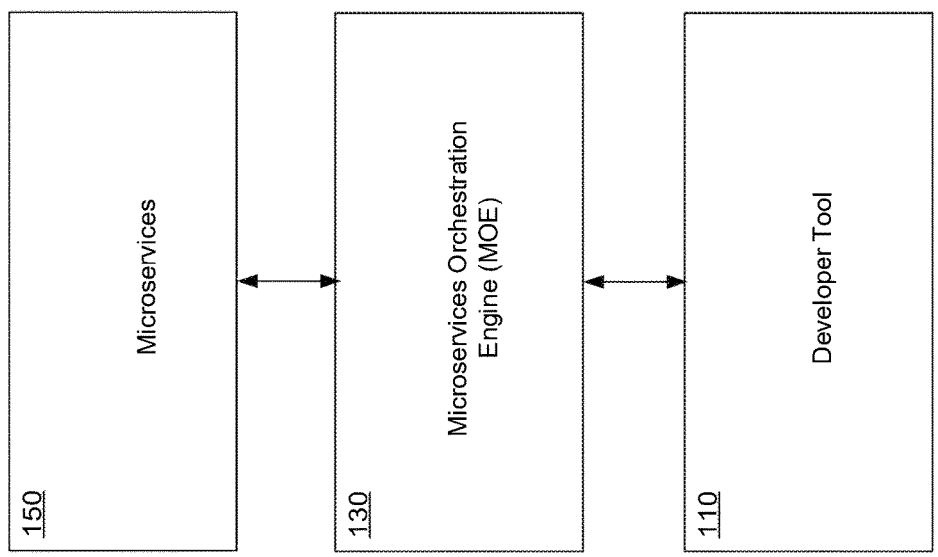
FIG. 1 is a high-level block diagram of a developer system for testing back-end processes of financial transactions, according to embodiments of the present disclosure.

Systems, media, and methods for back-end processing of financial transactions (e.g., credit card purchases/payments) would be improved if software developers were able to generate and test authorizations and settlements in simple-to-use applications. The ability to generate the simulated transactions to test for both authorization and settlement, without the need for complex programming knowledge or intricate knowledge of vendor formatting, would permit more robust feature development in microservices environments. Likewise, enabling the generation of these simulated transactions in large quantities would permit a number of use cases to be tested at once. Simulating rare or even impossible transaction scenarios would also prevent blind spots or loopholes in the development process and lead to better functioning features in developed applications and web sites.

The components and/or elements described below can be employed in an overall development architecture to facilitate a development process across a range of software applications. These and other embodiments can be particularly useful for a financial institution such as a bank, credit union, or credit card provider. As a single source of developer tools, various applications can be used within the environment to overcome challenges specific to the industry. More particularly, the application development process and need for interconnected solutions in these industries can create technical obstacles not found in other software development environments.

The combination of regulatory and technical complications associated with the security of information for financial institutions creates a unique set of challenges that this system addresses. Primary among those impediments are the complexity of the constituent pieces involved, the interconnected nature of the sub-systems and processes, and the specificity of each. To meet and overcome those hurdles, the disclosed system simplifies the development process with respect to required background knowledge. The described sub-systems, elements and tools also work together (with the aid of "METHODS, SYSTEMS, AND MEDIA FOR A MICROSERVICES ORCHESTRATION ENGINE", U.S. patent application Ser. No. 17/079,763, filed Oct. 26, 2020, incorporated by reference herein in its entirety) to provide interconnected solutions across the development life cycle.

Starting with the business processes that underly each of the phases that a developer must address, the overall development architecture disclosed in this application can be used to guide a software innovation in the financial services field from start to finish. Once business processes are identified (with or without the use of the specific tools of this system, such as found in "METHODS, SYSTEMS, AND MEDIA FOR GENERATING AN UPDATED WORKFLOW FOR AN OPERATION EXECUTABLE BY A COMPUTING DEVICE", U.S. patent application Ser. No. 17/079,767, filed Oct. 26, 2020, incorporated by reference herein in its entirety), the software development environment can be used to create test users and accounts (which is discussed in further detail in "GENERATING TEST ACCOUNTS IN A CODE-TESTING ENVIRONMENT", U.S. patent application Ser. No. 17/079,758, filed Oct. 26, 2020, incorporated by reference herein in its entirety). A developer can further test users and accounts through each phase of a variety of transactions expected of those users/accounts, and even test processes with outside vendors and third parties which previously had no means for testing (found in this disclosure as well as in "METHODS, SYSTEMS, AND MEDIA FOR ACCESSING DATA FROM A SETTLEMENT FILE", U.S. patent application Ser. No. 17/183,579, filed Feb. 24, 2021, incorporated by reference herein in its entirety).

The phase-by-phase analysis of code under development can also be used to test recurring transactions, interconnected transactions (e.g., authorization and settlement), or produce negative testing/edge testing scenarios of a completely hypothetical nature. The ability to connect the various processes can allow a developer to probe the interactions that occur due to changes in existing products and services, as well as explore the performance of code for new products and services. The architecture and implementation of the disclosed systems have been created in such a way as to also provide "cascading" updates. The level of abstraction within the disclosed framework ensures that changes made at one point in the system are reflecting in related processes elsewhere in the development architecture (e.g., alterations made in generating test accounts that should affect other testing tools are updated in those other applications).

The embodiments described below provide such solutions in the form of an authorization generator and a settlement generator for implementing the above-noted improvements. Operating in a microservices environment (i.e., small, loosely coupled services working in concert to enable applications and web sites), the described applications allow for intuitive programming processes. Human-readable JavaScript Object Notation (JSON) files, which are configurable and flexible, allow developers to leverage existing APIs and processes. The human-readable objects are later transformed into binary file formats to complete testing/simulation by processing with third-party vendors or other disparate processing components within a single, closed development system.

To generate test authorization(s), systems and/or media including one or more computing devices may generate a initial data set corresponding to a financial transaction. Responsive to the initial data set being generated, instructions for an alteration to one or more fields of information included in the initial data set are received and executed by the one or more computing devices to form a test data set. The one or more computing devices then convert the test data set into a binary file, deserialize the test data set from the binary file, and generate a transaction file for the financial transaction based on the deserialized test data set.

To access a test settlement file, systems and/or media including a settlement generator expose an application programming interface (API) configured to permit alteration of one or more fields of test data in a test data file. One or more fields of test data exposed by the API are altered. The test data file in a configurable format is generated based on the one or more fields of test data and the alteration(s). The test data file is transmitted from the settlement generator to an orchestrator, where the binary file is converted from the test data file. The binary file is subsequently transmitted from the settlement generator to a third-party processor. The settlement generator retrieves one or more pieces of data from a test settlement file, where the test settlement file includes processing results of the binary file received or retrieved from the third-party processor.

A user interface can be used to create back-end processing functionality for generating test authorizations and/or accessing a settlement file. For instance, a user interface may enable the importing/exporting of data, executing example API requests, adding financial transactions, modifying financial transactions, scheduling transactions, or a combination thereof. When generating and accessing a settlement file, another user interface displays an exposed API. Instructions for altering one or more fields of information of test data in the test data file are received via the user interfaces. The user interface through which the settlement file is accessed may also enable importing/exporting data, formatting data for viewing, and refreshing the information displayed via the user interface.

FIG. 1 is a high-level block diagram of a developer system 100 for testing verification protocols and procedures involved in the back-end processing or validation of financial transactions (e.g., consumer purchases). According to embodiments of the present disclosure, developer system 100 may be used for generating test authorization for a financial transaction. The financial transaction may be a simulated financial transaction (e.g., created in a non-production environment), or a completed transaction received directly from a credit card provider, financial institution, etc. Examples of non-production environments may include a code-testing environment, a quality assurance (QA) environment, or an environment used to conduct multiple aspects of the testing and QA processes. As depicted, developer system 100 includes a developer tool 110, microservices orchestration engine (MOE) 130, and microservices 150.

Developer tool 110 is shown communicating with MOE 130, and MOE 130 is shown communicating with microservices 150. Various protocols enable communications between developer tool 110, MOE 130, and data stores 150. The same or different protocols may enable requests between developer tool 110 and MOE 130 as those that also enable the access requests between MOE 130 and data stores 150. The protocols may include, but are not limited to, calls to databases, mainframes, and application programming interfaces (APIs), as well as calls between cloud services, cloud files, and schedulers. Furthermore, segments of code can be constructed through a combination of Simple Object Access Protocol (SOAP) service calls, Oracle and/or SQL database calls, calls to miscellaneous databases, database (DB) gateway calls, Representational state transfer (RESTful) application programming interface (API) calls, T-SYS mainframe emulator communications, third-party data source communications, and/or cloud services files.

In embodiments, developer tool 110 is configured to communicate with microservices 150. As depicted in FIG. 1, the communication between developer tool 110 and microservices 150 is coordinated by MOE 130. However, in alternative embodiments, developer tool 110 may communicate directly with microservices 150. The same or different protocols, segments of code, or methods can be used to enable communication between developer tool 110 and microservices 150.

MOE 130 is configurable to coordinate the exchange of data between developer tool 110 and microservices 150. Such exchanges are configurable through one or more engine framework files having a human-readable format. For example, MOE 130 may be configurable through use of a JSON document. In other embodiments, other types of human-readable files render MOE 130 configurable, such as through an XML or Google Protocol Buffer (Protobuf) file. The engine framework can be embodied with instructions for coordinating input requests received from a user interface and microservices components communicating with MOE 130, such as microservices 150.

The engine framework can combine an input request, received from a user interface, with framework specifications to form a job stream. The input request can be one or more test authorization requests or one or more test settlement requests. The formed job stream can include application programming interface API calls, Simple Object Access Protocol (SOAP) service calls, database calls, cloud services calls, and/or mainframe emulator communications. MOE 130 may be configured to: populate, from the data being exchanged, fields of information corresponding to fields of information in a user interface exposed by developer tool 110; convert the data being exchanged into a different format; form a queue of tasks for completion, and/or any combination thereof.

Microservices 150 may include one or more particular microservices (e.g., an application or a more specific, granular function) and/or any data associated with said services. These microservices may run computer-executable code to produce a specific, desired outcome. Examples include performing a mathematical operation, or a series of mathematical operations, on a set of numbers; converting a type of file/data into another type of file/data; generating and/or randomizing a data set; generating an authorization or otherwise granting permissions to produce/access specified (e.g., requested by a user) data; and/or a combination thereof.

Microservices 150 may also include databases, servers, or other data stores with which MOE 130 and/or developer tool 110 communicates. These data stores may be local to system 100, disparate, or a combination thereof. Data transmitted by/retrieved from microservices 150 may be used by developer system 100 to generate test authorization for a financial transaction. For example, such transmissions could test authorization for a specific merchant, for a type of transaction, for a type of credit card, or other variable in the purchasing process.

Microservices 150 may belong to or otherwise be affiliated with an institution utilizing developer tool 110. Additionally and/or alternatively, microservices 150 may belong to or otherwise be affiliated with third parties external to the institution. Examples of third parties to whom microservices 150 may belong and/or otherwise be affiliated with include payment processors, credit card providers, credit bureaus, credit reporting agencies, medical facilities, educational institutions, or financial institutions.

As an example, a user of developer system 100 (e.g., a software developer at a financial institution, such as a bank) may generate test authorization for a financial transaction included in a transaction file. In accordance with the present disclosure, system 100 may include one or more computing devices (e.g., a memory configured to store a set of computer-executable steps and one or more processors configured to perform the steps stored in the memory) for generating test authorization for the financial transaction. The steps performed by developer system 100 to generate the transaction file may include generating an initial data set corresponding to a financial transaction. For example, the initial data set may be a randomly generated data set, although the initial data set is not limited to such. Via a user interface, the user of developer tool 110 may alter one or more fields of information included in the initial data set to form a test data set. Alterations to the fields of information are made responsive to system 100 receiving an instruction for an alteration via the user interface. An application programming interface (API) exposed by developer tool 110 is a non-limiting example of a user interface through which a user of system 100 may make alterations to the initial data set to form the test data set.

MOE 130 may coordinate with microservices 150 to aggregate data corresponding to fields of information included in the test data set. In accordance with the present disclosure, a user of developer tool 110 may populate the aggregated data into the corresponding field of information included in the test data set. MOE 130 may populate the aggregated data into the corresponding field of information included in the test data set. Alternatively, a user of developer tool 110 may populate a portion of the aggregated data into the corresponding field of information included in the test data set while MOE 130 populates another portion.

Subsequent to the test data set being generated, one or more components of developer system 100 convert the test data set into a binary file. In some embodiments, MOE 130 performs the conversion. Responsive to conversion into the binary file, the test data set is deserialized in some embodiments. Responsive to deserialization of the test data set, a transaction file for the financial transaction is generated based on the deserialized test data set in some embodiments.

The transaction file may be a binary file of a different format than the previous binary file, formatted to the specifications of the microservice component of microservices 150 to which it will be transmitted. For example, the transaction file may be specifically formatted for a third-party vendor to process authorizations against credit/debit cards. In other embodiments, the transaction file may be formatted for a third-party vendor to settle transactions. These may be test authorizations or settlements against existing accounts, or against test user accounts such as those generated by a test account generator.

Figure 2:
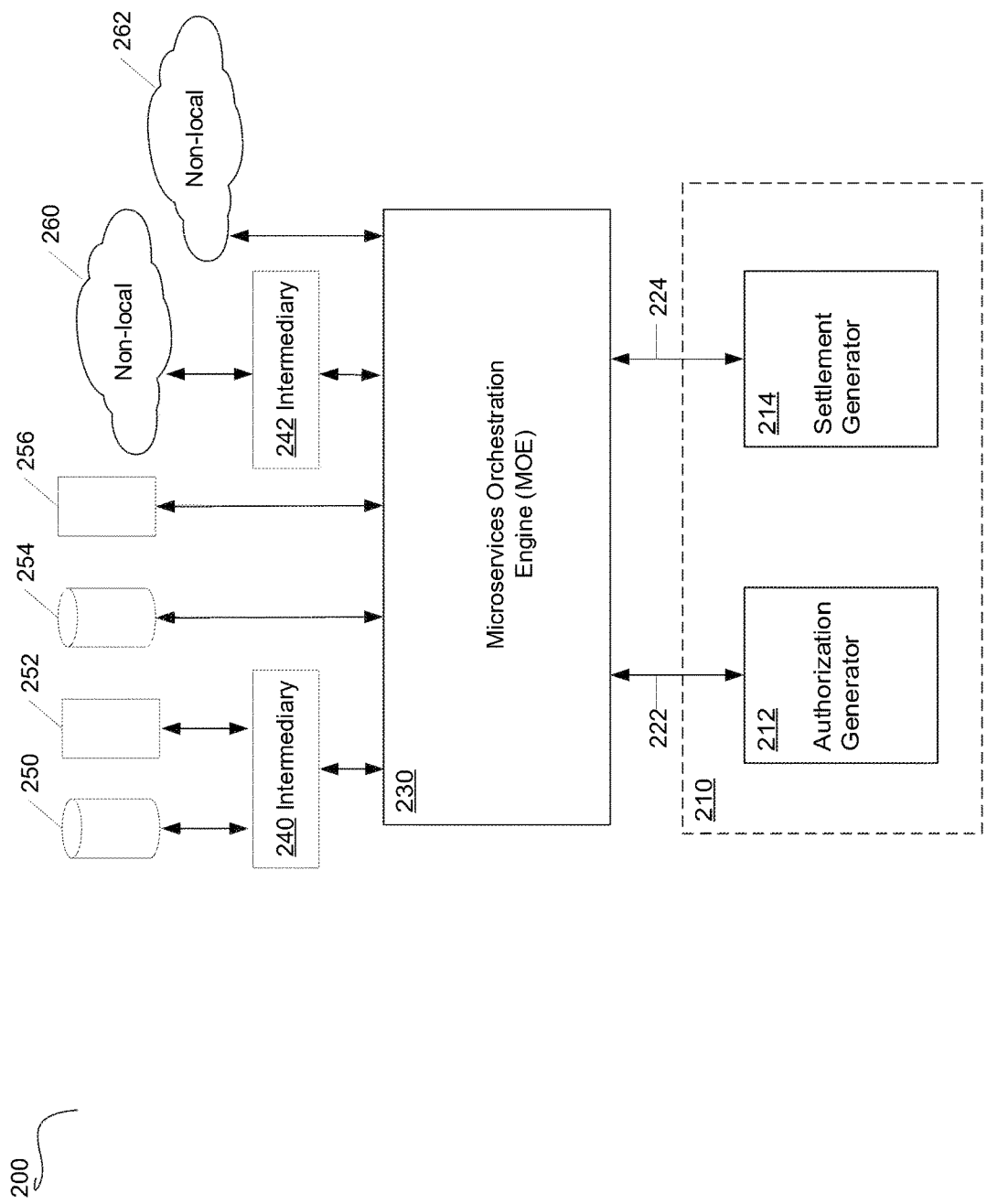
FIG. 2 is a more detailed illustration of a code-development system for testing back-end processes of financial transactions, according to embodiments of the present disclosure.

FIG. 2 illustrates a code-development system 200 for generating test authorization for a financial transaction and/or a test settlement. Code-development system 200 may be substantially similar/identical to the system depicted in FIG. 1 and provides additional details of certain components in accordance with the present disclosure. Code-development system 200 includes developer tool 210, communication pathways 222 and 224 (collectively 'communication pathways 22X'), microservices orchestration engine (MOE) 230, intermediaries 240 and 242 (collectively 'intermediaries 24X'), microservices 250, 252, 254, and 256 (collectively 'microservices 25X'), and non-local data stores 260 and 262 (collectively 'non-local data stores 26X').

As depicted in FIG. 2, developer tool 210 includes authorization generator 212 and settlement generator 214. Authorization generator 212 may be configured to generate test authorization for a financial transaction and settlement generator 214 may be configured to generate a settlement file corresponding to a financial transaction. In some examples, the financial transaction for which a settlement file is generated by settlement generator 214 may be the same financial transaction for which the test authorization was generated by authorization generator 212.

FIG. 2 illustrates authorization generator 212 and settlement generator 214 communicating directly with MOE 230 via communication pathways 222 and 224, respectively. Although not shown in FIG. 2, communication pathways 22X may bypass MOE 230. In those instances, communications pathways 22X may extend to microservices 25X and/or non-local data stores 26X directly or through one of the intermediaries 24X. In other words, either of authorization generator 212 or settlement generator 214 (or both) may communicate with microservices 25X or non-local data stores 26X, either directly or through intermediaries 24X.

Communications pathways 22X are bi-directional communications links between developer tool 210 (and, by extension authorization generator 212/settlement generator 214) and microservices 25X/non-local data stores 26X. As described above, data exchanged between developer tool 210 and microservices 25X and/or the non-local data stores 26X may be exchanged directly, pass through MOE 230, pass through intermediaries 24X, and/or a combination thereof. Communications pathways 22X may be enabled by a number of communications protocols, including various TCP/IP (Transmission Control Protocol/Internet Protocol) forms, Bluetooth, Wi-Fi (e.g., the IEEE 802.11 standard), and cellular protocols (e.g., 2G/3G/4G/LTE/5G). Calls to various databases, mainframes, APIs, cloud services, cloud files, schedulers, and/or a combination thereof may also enable communications pathways 24X.

MOE 230 is configurable to coordinate the exchange of data between developer tool 210 and the back-end components (i.e., microservices 25X and/or non-local data stores 26X). MOE 230 may be configured to: populate, from the data being exchanged, fields of information corresponding to fields of information in the initial data set being generated via a user interface exposed by developer tool 210; convert the data being exchanged into a different format; form a queue of tasks for completion, and/or any combination thereof.

Intermediaries 24X are shown as being between MOE 230 and microservices 25X/non-local data stores 26X. Intermediary 240 may be any number of mainframes, frameworks, databases, servers, and/or emulators of the same. Intermediary 240 may act as a buffer and/or as a source of redundancy for data being exchanged between MOE 230 and any combination of microservices 25X. The mainframes, frameworks, databases, or servers which are used as intermediary 240 may be local to code-development system 200, disparate, or any combination thereof.

Intermediary 242 may be any number of message/integration brokers (also known as interface engines). As with intermediary 240, intermediary 242 may act as a buffer and/or as a source of redundancy for data being exchanged between MOE 230 and any combination of non-local data stores 26X. Examples of message brokers that may be used as intermediary 242 include, but are not limited to, all versions/iterations developed by the Apache Software Foundation® such as ActiveMQ or Kafka, Amazon Web Services (AWS), Google Cloud Pub/Sub, HiveMQ, IBM App Connect, IBM MQ, Microsoft Azure, Open Message Queue, Oracle Message Broker, NATS, RabbitMQ, Redis, SAP PI/SAP AG, and/or any combination thereof.

Microservices 25X may include a variety of computer applications and the data associated therewith, one or more devices (e.g., a server) executing the applications, and/or a repository (e.g., a database) storing the data associated with the applications. The repository on which data associated with an application is stored may be local to the device executing the application, disparate from that device, or a combination thereof. Applications executed may perform various tasks, or a series of tasks, for producing a desired outcome. The outcome may be stored locally and/or disparately, transmitted to developer tool 210 either directly or by way of MOE 230, and/or retrieved by developer tool 210 either directly or by way of MOE 230.

Non-local data stores 26X may include a variety of services used in generating/processing financial transactions. For instance, non-local data stores 26X may include solutions/platforms enabling the processing of payments made using a credit card. TSYS® (of Columbus, Ga.) is an example of such a payment platform that is widely used by major credit networks. Non-local data stores 26X may also include the credit card networks themselves. Using code-development system 200, a developer may pull financial transaction data directly from a credit card provider to generate test authorization for financial transactions.

In a non-limiting example, code-development system 200 may be used to generate test authorization for a financial transaction included in a transaction file based on a test data set derived from an initial data set. The initial data set may simulate or otherwise correspond to aspects of the financial transaction including a purchase amount, a vendor, associated vendor information, a date of purchase, a time of purchase, or other details of the financial transaction.

A user of developer tool 210 may alter one or more fields of information included in the initial data set to form a test data set. In some embodiments, altering the one or more fields of information may include altering an account number, a type of account, account activation status, account activation codes, variables related to validity of an account activation code, merchant codes, and/or any combination thereof.

Alterations to the fields of information may be made responsive to code-development system 200 receiving an instruction for an alteration via a user interface (shown and described in greater detail below in FIG. 5 and/or FIG. 8). Instructions for an alteration may be communicated to code-development system 200 using any number of human interface devices including, but not limited to, a mouse, a keyboard, a touch-sensitive display device, a trackpad, a signature pad, a joystick, and/or a combination thereof. In various embodiments, the user interface through which alterations to the fields of information are made is authorization generator 212 (as shown in FIG. 5). Authorization generator 212 may be an application executed by developer tool 210 and/or an API exposed by developer tool 210. In other embodiments, the user interface through which alterations to the fields of information are made is settlement generator 214 (as shown in FIG. 8).

A test data set is converted into a binary file responsive to formation of the test data set. In some embodiments, MOE 230 converts the test data set into the binary file. In these embodiments, responsive to conversion into a binary file, MOE 230 transmits the binary file to a message broker.

MOE 230 may coordinate with microservices 25X and/or non-local data stores 26X to aggregate data corresponding to fields of information included in the test data set, or that is otherwise associated with the financial transaction for which the transaction file is being generated. In some embodiments, data exchanged between MOE 230 and microservices 25X and/or non-local data stores 26X may pass through intermediaries 24X, while in other embodiments, the data exchanged may not pass through intermediaries 24X.

In some embodiments, the test data set is deserialized responsive to conversion into a binary file. Responsive to deserialization, a transaction file for the financial transaction is generated based on the deserialized test data set in certain embodiments.

In some embodiments, the steps for generating a transaction file may also include a scheduling process configured to transmit the transaction file to a third-party processor, such as TSYS®. Furthermore, the transaction file may be formatted based on processing specifications utilized by the third-party processor to process financial transactions.

In other embodiments, a test settlement file is generated from a binary file. The test settlement file includes processing results of a binary file received from the third-party processor. In embodiments, the processing results of the binary file are from TSYS® as noted above, but are formatted for a test settlement file rather than test authorization. In all of the above and below examples, the test settlements or authorizations may be for an existing user account, or for a test user account generated by a test account generator.

Figure 3:
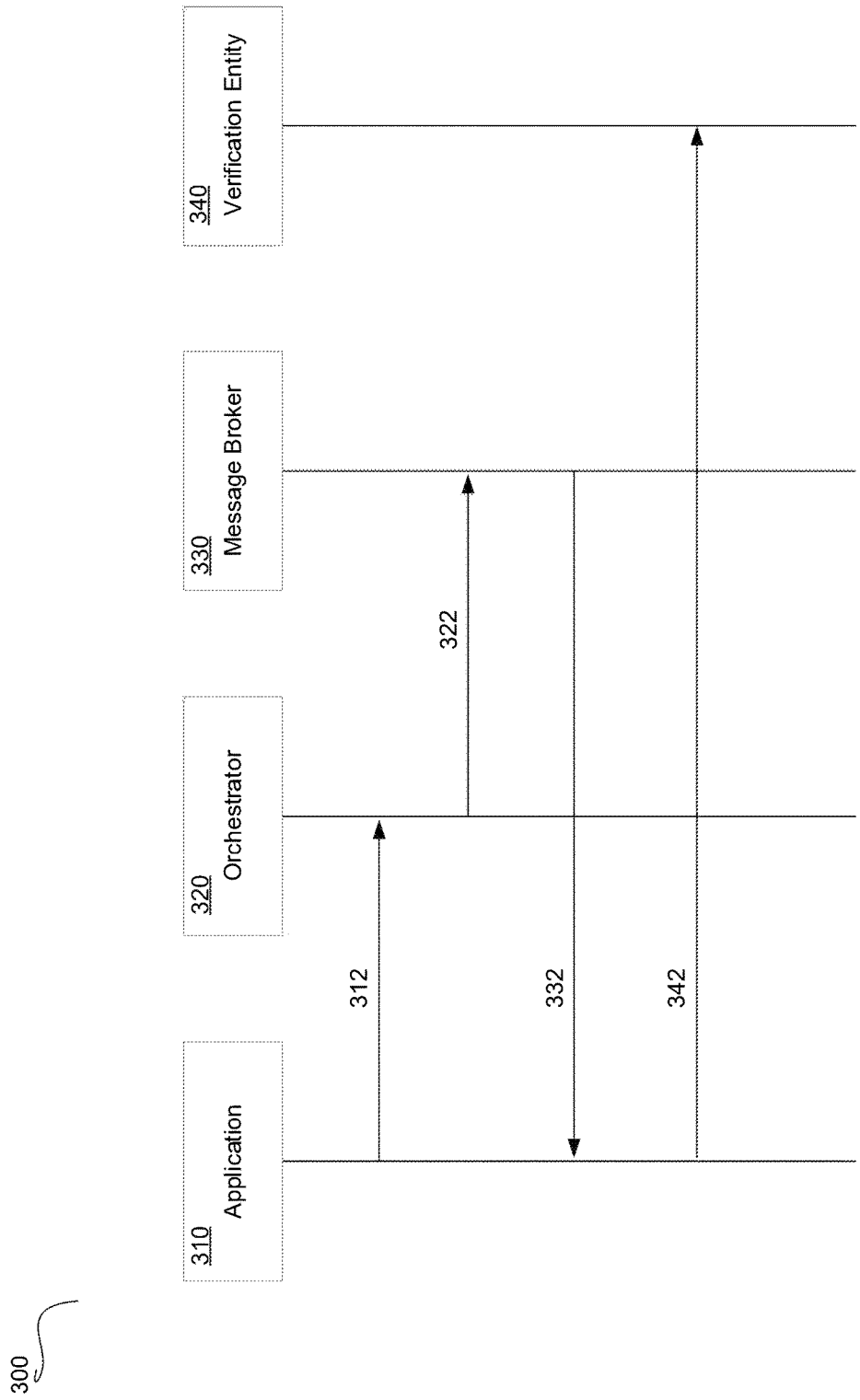
FIG. 3 is a message sequence chart for generating test authorization for financial transactions, according to embodiments of the present disclosure.

FIG. 3 is a message sequence chart 300 of messages (e.g., data) flowing between the various sub-components of a test authorization system, where the system in chart 300 is used for generating a test authorization for a financial transaction. The system depicted in chart 300 may be substantially similar/identical to systems 100 and/or 200 described above. Included in the system of chart 300 are test authorization application 310, orchestrator 320, message broker 330, and verification engine 340.

Test authorization application 310 may be substantially similar/identical to authorization generator 212 described above. In some examples, test authorization application 310 may receive instructions (e.g., via a user interface) from a user of test authorization system 300 to alter fields of information included an initial data set generated by system 300. Responsive to the alterations being made, a test data set is formed from the initial data set. Test authorization application 310 transmits a communication 312 with the test data set to orchestrator 320. Orchestrator 320 converts the test data set into a binary file and orchestrator 320 transmits the binary file to message broker 330 in a communication 322.

Generally, a message broker acts as a "go-between", enabling interdependent sub-components of a system to communicate with one another when, due to compatibility issues, such communication would not otherwise be feasible. To overcome these compatibility issues, the message broker may receive data from a sub-component of the system and convert the data into a different language, format, and/or platform that is usable by other sub-components of the system. Responsive to the conversion, the other sub-components of the system retrieve the converted data from the message broker.

Continuing the example shown in FIG. 3, test authorization application 310 may retrieve from message broker 330 the binary file in a communication 332. Alternatively, message broker 330 may transmit the binary file to application 310 in communication 332. Responsive to retrieval or reception, test authorization application 310 deserializes the test data set from the binary file. The deserialized test data set is sent to/retrieved by verification entity 340 in a communication 342, where authorization for a transaction file for the financial transaction is generated.

Figure 4:
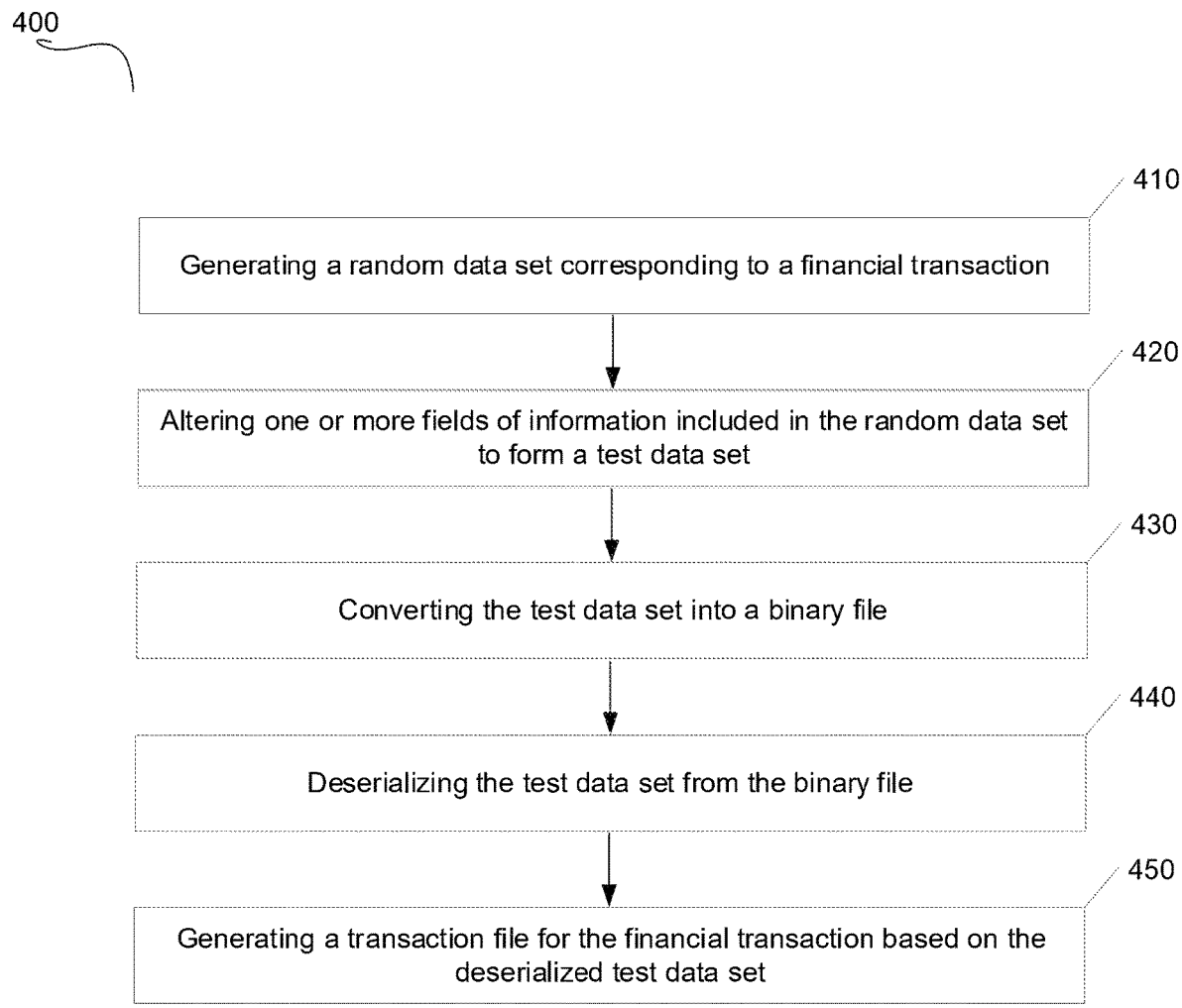
FIG. 4 is a flowchart outlining a method for generating test authorization for financial transactions, according to embodiments of the present disclosure.

FIG. 4 is a flowchart representing a method 400 of generating test authorization for financial transactions. At a step 410, one or more computing devices generate an initial data set corresponding to a financial transaction. In some embodiments, the initial data set corresponding to the financial transaction may simulate consumer purchases and/or related data. Examples of the data related to a consumer purchase may include a purchase amount, a vendor/merchant, associated vendor/merchant information, a date of purchase, a time of purchase, other simulated transaction details, and/or a combination thereof.

At a step 420, one or more fields of information included in the initial data set are altered by the one or more computing devices to form a test data set. The alterations are made in response to receiving an instruction for an alteration via a user interface. Examples of fields of information which may be altered include, but are not limited to an account number, a type of account, activation status of an account, account activation codes, variables related to account activation code validity, merchant codes, or any combination thereof. Examples of a user interface through which an alteration may be made include, but are not limited to, a display device, a touch-sensitive display device, a keyboard, a mouse, a trackpad, a signature pad, a joystick, and/or a combination thereof.

At a step 430, the one or more computing devices convert the test data set into a binary file. In some embodiments, an orchestrator substantially similar/identical to MOE 230/Orchestrator 320 may convert the test data set into a binary file. In other embodiments, an application substantially similar/identical to application 310 may convert the test data set into a binary file. In some embodiments, the orchestrator may transmit the binary file to a message broker.

Responsive to conversion of the test data set into a binary file, at step 440, the one or more computing devices deserialize the test data set from the binary file. Responsive to deserialization, at step 450, the one or more computing devices generate a transaction file for the financial transaction based on the deserialized test data set. In some embodiments, responsive to the transaction file being generated, a scheduling process is configured to transmit the transaction file to a third-party processor, such as TSYS®. In such instances, the transaction file may be formatted based on processing specifications utilized by the third-party processor (i.e., TSYS®) to process financial transactions.

In accordance with the present disclosure, a non-transitory computer-readable storage medium may include a set of computer-executable instructions. Execution of the instructions, by one or more processing devices, causes the one or more processing devices to perform steps for executing a method for generating test authorization for financial transactions that is substantially similar/identical to method 400 described in the discussion of FIG. 4. The various steps and features may also be substantially similar to the steps and features outlined above with respect to the files, transmissions, conversions, processes and results thereof employed by, in or for method 400. The method 400 may be used with existing accounts, or may take place after creating test user accounts with a test account generator (which is found in "GENERATING TEST ACCOUNTS IN A CODE-TESTING ENVIRONMENT", U.S. patent application Ser. No. 17/079,758, filed Oct. 26, 2020.

Figure 5A:
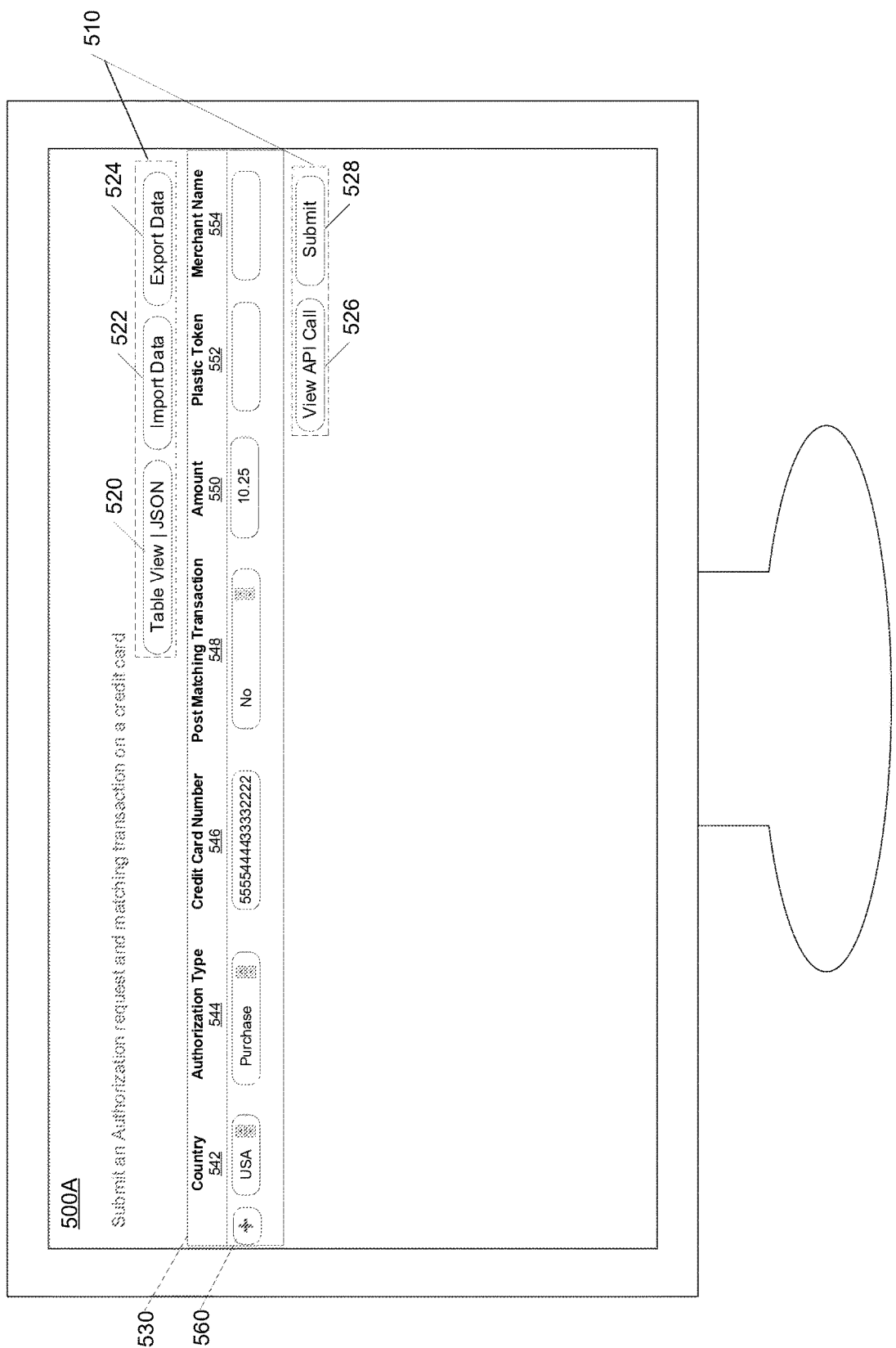
FIGS. 5A and 5B are illustrations of a user interface enabling generation of test authorization for financial transactions, according to embodiments of the present disclosure.
Figure 5B:
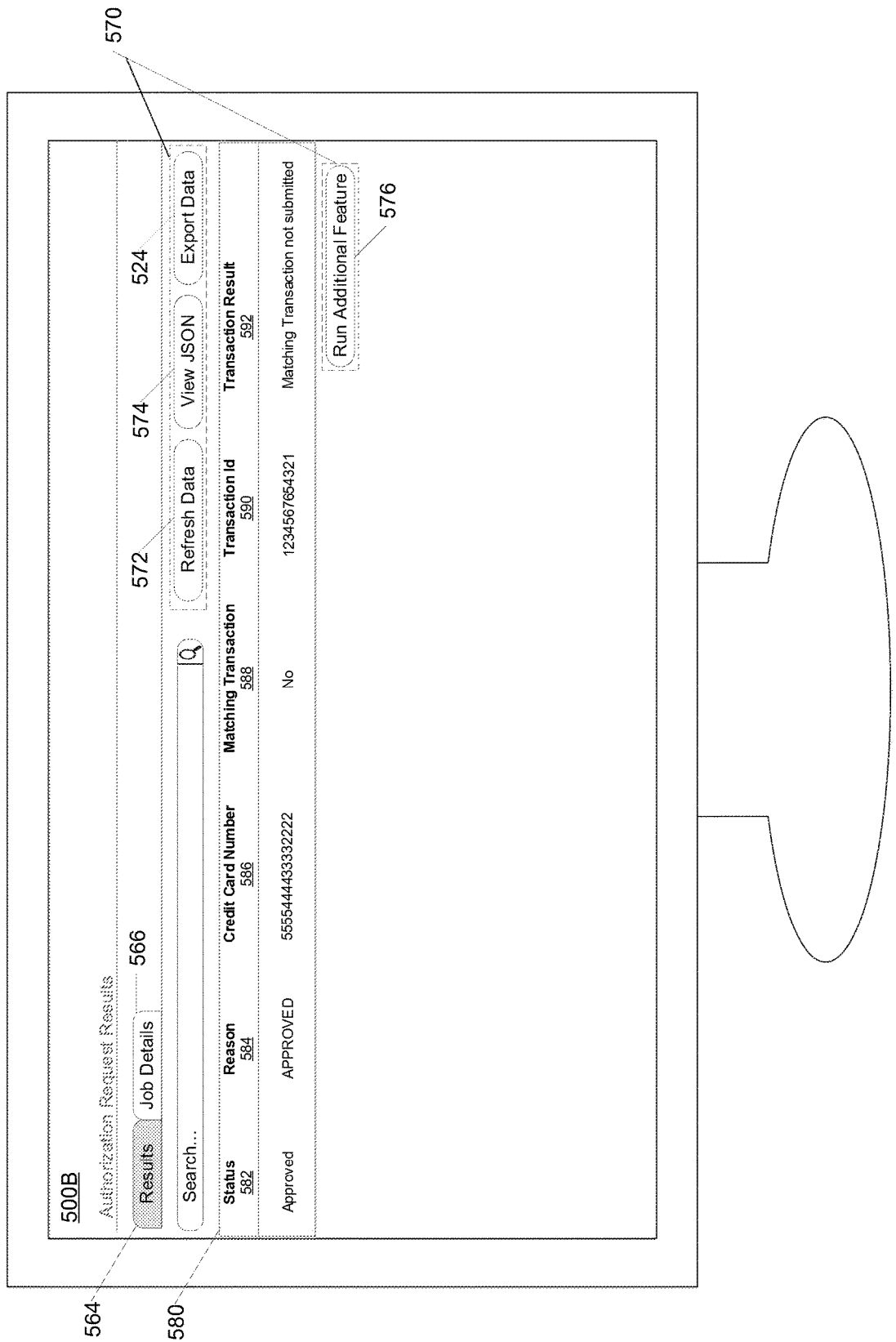

FIGS. 5A and 5B are illustrations of a user interface 500 (depicted as 500A and 500B in the respective figures) through which authorization for a financial transaction may be generated and/or tested, according to an embodiment of the present disclosure. FIG. 5A illustrates an application identical or substantially similar to authorization generator 212 configured to submit an authorization request along with a matching credit card transaction. FIG. 5B illustrates an example display of the results of a returned authorization request.

User interface 500A is configured to display a set of functional buttons 510 and a data table 530. The set of functional buttons 510 enable the user to manipulate the fields of information corresponding to the financial transaction for which an authorization request is being submitted. For example, functional button 520 allows the user to toggle between a table view and a JSON view of the data table 530. Functional button 522 enables the user to import additional financial transactions into data table 530 while functional button 524 allows the user to export the data table 530 (e.g., to a different file format for testing elsewhere in a code-testing and/or QC environment). Further, functional button 526 enables the user to view an API call that will be generated for the financial transaction(s) included in the data table 530. In accordance with the present disclosure, the API call may pull financial transaction information directly from a credit card provider, and in some examples, the API call may be editable by the user. Finally, functional button 528 enables the user to submit the authorization request.

The user interface 500A of FIG. 5A includes a data table 530 representing one or more financial transactions for which the user is submitting an authorization request. Various fields of information 542-554 corresponding to the financial transaction are included in data table 530. These fields of information include Country 542, Authorization Type 544, Credit Card Number (CCN) 546, Post Matching Transaction 548, Amount 550, Plastic Token 552, and Merchant Name 554 (collectively "the fields of information 5XXA"). More, fewer, or different fields of information corresponding to a financial transaction for which an authorization request is being submitted than those depicted in FIG. 5A may be considered when submitting the authorization request. Thus, different arrangements of the information shown in fields of information 5XXA may be contemplated within the scope of this disclosure.

Button 560 is configured to allow a user to add a specific financial transaction to the authorization request. The user may click or otherwise select any buttons displayed via user interface 500A using a mouse or other suitable pointing device (e.g., a finger or a stylus on a touch-sensitive display device), a keyboard, a trackpad, a signature pad, or a joystick, among others, or a combination thereof. To fill in the various fields of information displayed via user interface 500A, any combination of interface devices may be used to select a button.

FIG. 5B illustrates an example display 500B of the results of a returned authorization request. User interface 500B includes two view tabs, Results tab 564 and Job Details tab 566 (collectively "view tabs 56X"), as well as a second set of functional buttons 570 and a data table 580. As depicted in FIG. 5B, the Results tab 564 is selected. Alternatively, the user may select the Job Details tab 566 to review the information that was submitted in making the authorization request (e.g., the information that was described in the discussion of FIG. 5A above).

Returned authorization results may be manipulated by selecting a second set of functional buttons 570 displayed via user interface 500B. For example, the user may export the authorization request results by selecting functional button 524, which functions as previously described with respect to user interface 500A. Further, the user may refresh the data displayed in data table 580 by selecting functional button 572. The user may also view data table 580 in a JSON format by selecting functional button 574. Moreover, the user may run additional features related to the authorization request results by selecting functional button 576. The user may use a search bar (shown without numbering between view tabs 56X and data table 580) to execute a keyword search among the authorization results returned in data table 580. The search for those keywords may be executed by selecting the functional button represented by a magnifying glass (also shown but not numbered).

Data table 580 contains the authorization request results. Data table 580 includes various fields of information corresponding to the approval. As depicted in FIG. 5B, the fields of information included in the results of this particular authorization request include Status 582, Reason 584, Credit Card Number 586, Matching Transaction 588, Transaction Id 590, and Transaction Result 592 (collectively, "the fields of information 5XXB"). Data table 580 may present a different combination of the fields of information 5XXB (potentially including fields of information not shown in FIG. 5B) depending on the fields of information submitted in making the request.

As a non-limiting example, a developer may use an application substantially similar or identical to authorization generator 212 to generate a test authorization for a financial transaction for a credit card number "9999888877776666" or for multiple credit cards. The test authorization(s) may be for an existing account or for one or more accounts generated by a test account generator. The application may present to the developer a user interface 500A via which a data table 530 is displayed. The fields of information 5XXA are included in data table 530, which correspond to one or more financial transactions completed on the credit card. By selecting button 560, the developer may add the financial transaction(s) presented in data table 530 to the authorization request being generated.

In accordance with the present disclosure, the developer may manually select/input (e.g., from a drop-down menu or via keyboard) data into the fields of information 5XXA corresponding to the financial transaction(s) being added to the authorization request. To add a financial transaction to an authorization request, the developer may press functional button 526 to preview an API call. The API call may pull financial transaction data corresponding to the fields of information 5XXA from a particular credit card, and the developer may test authorization for any combination of the financial transactions pulled via the API call. Alternatively, the developer may select button 560 to add a financial transaction to the authorization request. More, fewer, or a different combination of fields of information 5XXA (including fields of information not displayed in FIG. 5A) may be used in generating authorization requests.

To further manipulate the data displayed in data table 530, the developer may select functional button 520 to toggle between a table view and a JSON view of data table 530. Although the ability to toggle to a JSON view is depicted in FIG. 5A, in other embodiments, it may be possible to present the financial transaction data in the form of a different human-readable computer-programming languages (e.g., as a .XML, file). The developer may elect to import financial transaction data by selecting functional button 522, or the developer may elect to export the financial transaction data included in data table 530 by selecting the export data functional button 524. Once satisfied with data table 530, the developer may submit the authorization request by selecting functional button 528.

FIG. 5B illustrates a user interface 500B displaying the authorization request results returned to the developer responsive to submitting the authorization request. The developer may select the Job Details tab 566 to review/revise the financial transaction information underlying the results being displayed via the Results tab 564. The results of the request are presented to the developer in data table 580. The developer can see the fields of information 5XXB corresponding to the authorization in data table 568. For example, the developer can see the Status of the authorization for the financial transaction ("approved") in field of information 582.

The developer may enter keywords into the search bar, and the developer may execute a search for those keywords by selecting the functional button denoted by the magnifying glass to filter through the authorization request results returned in data table 580. Selecting functional button 572 enables the developer to refresh the financial transaction data displayed in data table 580. If the developer modifies the financial transaction data underlying the authorization request via the Job Details tab 566, or if the developer adds additional financial transactions to the data table 580 as described during the discussion of FIG. 5A, selecting the refresh data functional button 572 will update data table 580 to reflect those changes/additions. Selecting functional button 574 enables the developer to switch to a view of a JSON version of the data table 580. In other embodiments, the developer may be able to view data table 580 in another human-readable computer-programming language (e.g., XML). The developer may export the results of the authorization request by selecting functional button 522. The developer may run additional features by selecting functional button 576.

Figure 6:
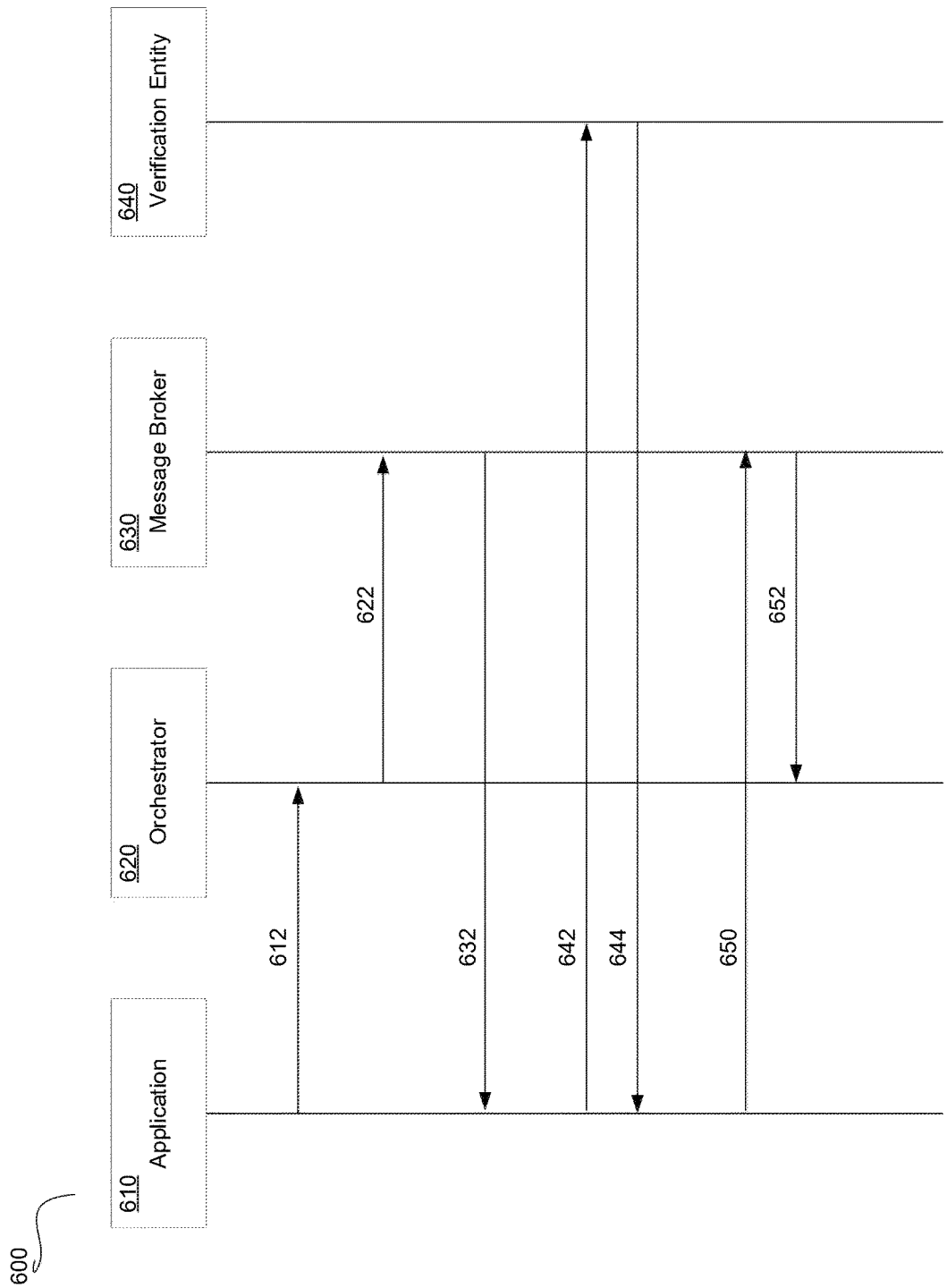
FIG. 6 is a message sequence chart for accessing a test settlement file, according to embodiments of the present disclosure.

FIG. 6 is a message sequence chart 600 for accessing a test settlement file, according to an embodiment of the present disclosure. A test settlement system used in message sequence chart 600 may be substantially similar/identical to systems 100 or 200 described above. Included in test settlement system are test settlement application 610, orchestrator 620, message broker 630, and verification engine 640.

Test settlement application 610 may be substantially similar/identical to settlement generator 214 described above and depicted in FIG. 2. In some examples, test settlement application 610 may receive instructions from a user of the test settlement system (e.g., via a user interface as shown and described in FIG. 8) to alter fields of information included in an initial data set generated by the system. Responsive to the alterations, a test data set is formed from the initial data set.

A communication 612, which includes the test data set, is transmitted from test settlement application 610 to an orchestrator 620. In certain embodiments, orchestrator 620 may be substantially similar or identical to MOE 130/230 described above. In some embodiments, orchestrator 620 converts the test data set into a binary file. Subsequent to that conversion, orchestrator 620 transmits a communication 622 to message broker 630. Communication 622 transmitted by orchestrator 620 contains the binary file from the conversion.

Continuing the example shown in FIG. 6, test settlement application 610 may retrieve the binary file from message broker 630 in a communication 632. Alternatively, message broker 630 may transmit the binary file to application 610 in communication 632 (i.e., communication 632 is pushed by message broker 630 rather than pulled by test settlement application 610). Responsive to retrieval or reception of the binary file, test settlement application 610 subsequently generates a transaction file based on the received/retrieved binary file.

The transaction file is communicated to verification entity 640 in a communication 642. As noted above with message sequence chart 300 and method 400, communication 642 can be sent to a third-party, such as TSYS®, for verification and processing. The transaction file in communication 642 is appropriately formatted for settlement processing, and thus will be different from the descriptions of a transaction file above. It should be noted that the transaction file may even be different depending on the card network for which the test is being run (e.g., Visa or Mastercard). In some embodiments, the transmission of communication 642 is facilitated by a scheduler, where the scheduling is coordinated by orchestrator 620.

Consistent with descriptions above and below, either existing accounts or test user accounts generated by a test account generator may be used in message sequence chart 600. Unlike authorization generator 212, message sequence chart 300 and method 400 described above, the settlement process involves additional steps and processing. Primarily, the authorizations generator is more concerned with the outbound file/format for the third-party processor. As shown in message sequence chart 600, settlement processes will include the return of processed information to the settlement generator. In some embodiments, a communication 644 is transmitted from verification entity 640 to application 610 (i.e., the settlement generator). In other embodiments, communication 644 is retrieved by application 610.

Once the verification entity 640 has received or retrieved processing results in the form of one or more settlement files, there may optionally be a transmission of a communication 650 between the settlement generator and message broker 630. Additional processing or formatting of the settlement results may be performed to further test the settled transactions. Likewise, a communication 652 may be sent from message broker 630 to orchestrator 620 in order to further process the results (e.g., formatting, conversion, scheduling, etc.).

Figure 7:
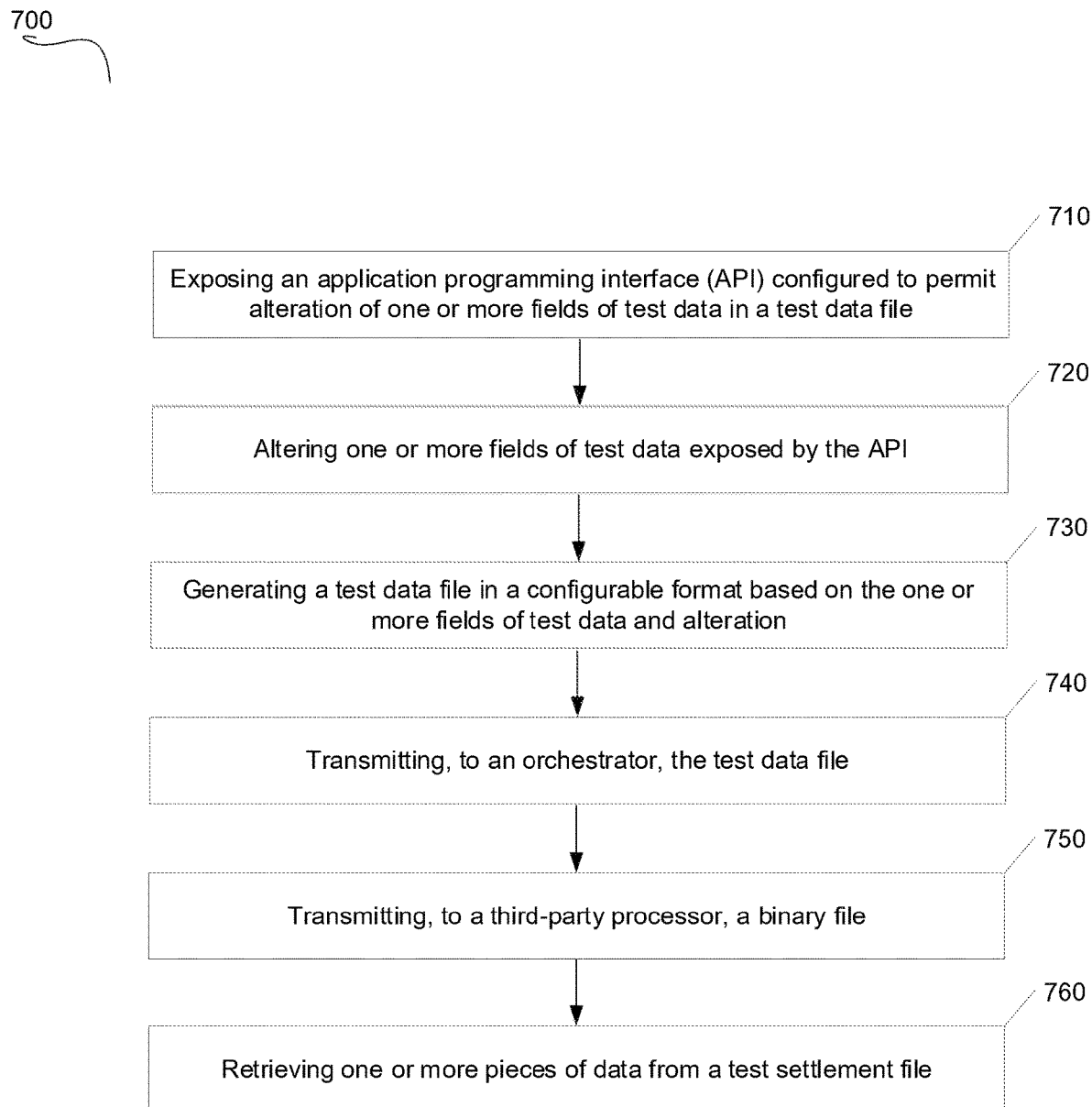
FIG. 7 is a flowchart representing a method for accessing a test settlement file, according to embodiments of the present disclosure.

FIG. 7 is a flowchart representing a method 700 for generating a test settlement file, according to an embodiment of the present disclosure. Method 700 is executed by one or more computing devices in a non-production development environment, such as the environment shown in FIG. 2 above. For example, in some embodiments settlement generator 214 and/or MOE 230 shown in FIG. 2 can perform steps described below. Method 700 can be performed independent of, or in conjunction with, a test account generator for creating test user accounts.

At a step 710, a settlement generator (e.g., settlement generator 214) exposes an application programming interface (API) configured to permit alteration of one or more fields of test data in a test data file. At a step 720, one or more fields of test data exposed by the API are altered. In certain embodiments, the alteration is the result of input from a user interface, such as the user interface shown in FIG. 8 and described above and below.

At a step 730, a test data file in a configurable format is generated based on the one or more fields of test data and the alteration(s). The configurable format can be a JSON file, an XML file, or a Protobuf file according to various embodiments. At a step 740, the test data file is transmitted from the settlement generator to an orchestrator, such as MOE 230 described above and shown in FIG. 2. In some embodiments, the transmission can be identical or substantially similar to communication 622 shown in FIG. 6 and described above). The orchestrator converts the test data file into a binary file, although alternatively the conversion can be performed by settlement generator 214 or another component of the system.

The binary file converted from the test data file is retrieved from the orchestrator by the settlement generator or, alternatively, transmitted by the orchestrator to the settlement generator. The binary file is then transmitted from the settlement generator to a third-party processor at a step 750. In some embodiments, the third-party processor at step 750 can be a payment processor, such as TSYS®. An example of a transmission to the third-party processor would be one identical or substantially similar to communication 642 shown in FIG. 6 and described above.

At a step 760, one or more pieces of data are retrieved from a test settlement file by the settlement generator. The test settlement file includes processing results of the binary file received from the third-party processor. Thus, once the third-party processor has taken the binary file and processed the transactions for settlement, the settlement generator can use a portion or all of that settlement file to test code under development.

The ability to employ method 700, much like method 300 previously described above, facilitates the code-testing process. The developer need not generate the binary file used by the third-party processor, therefore avoiding the intricate assembly/writing process leading up to testing various microservices components or functions. Instead, general knowledge of the transaction parameters the developer seeks to test are sufficient to generate the necessary files when used in conjunction with the interface described above and below.

In accordance with the present disclosure, a non-transitory computer-readable storage medium may include a set of computer-executable instructions. Execution of the instructions, by one or more processing devices, causes the one or more processing devices to perform steps for executing a method for accessing a test settlement file for financial transactions that is substantially similar/identical to method 700 described in the discussion of FIG. 7. The various steps and features may also be substantially similar to the steps and features outlined above with respect to the files, transmissions, conversions, processes and results thereof employed by, in or for method 700.

Figure 8A:
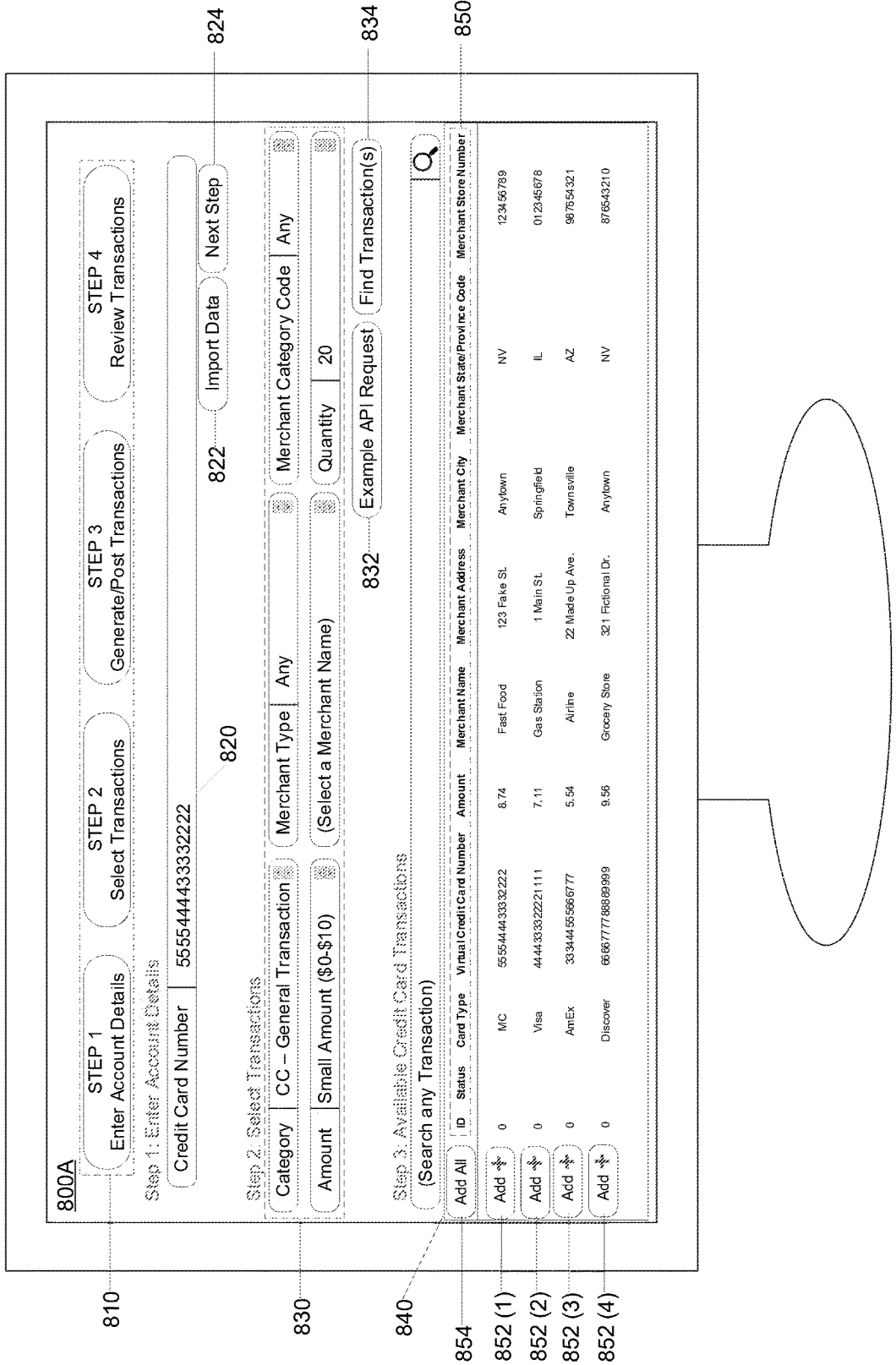
FIGS. 8A and 8B are illustrations of a user interface enabling generation of a test settlement file, according to embodiments of the present disclosure.
Figure 8B:
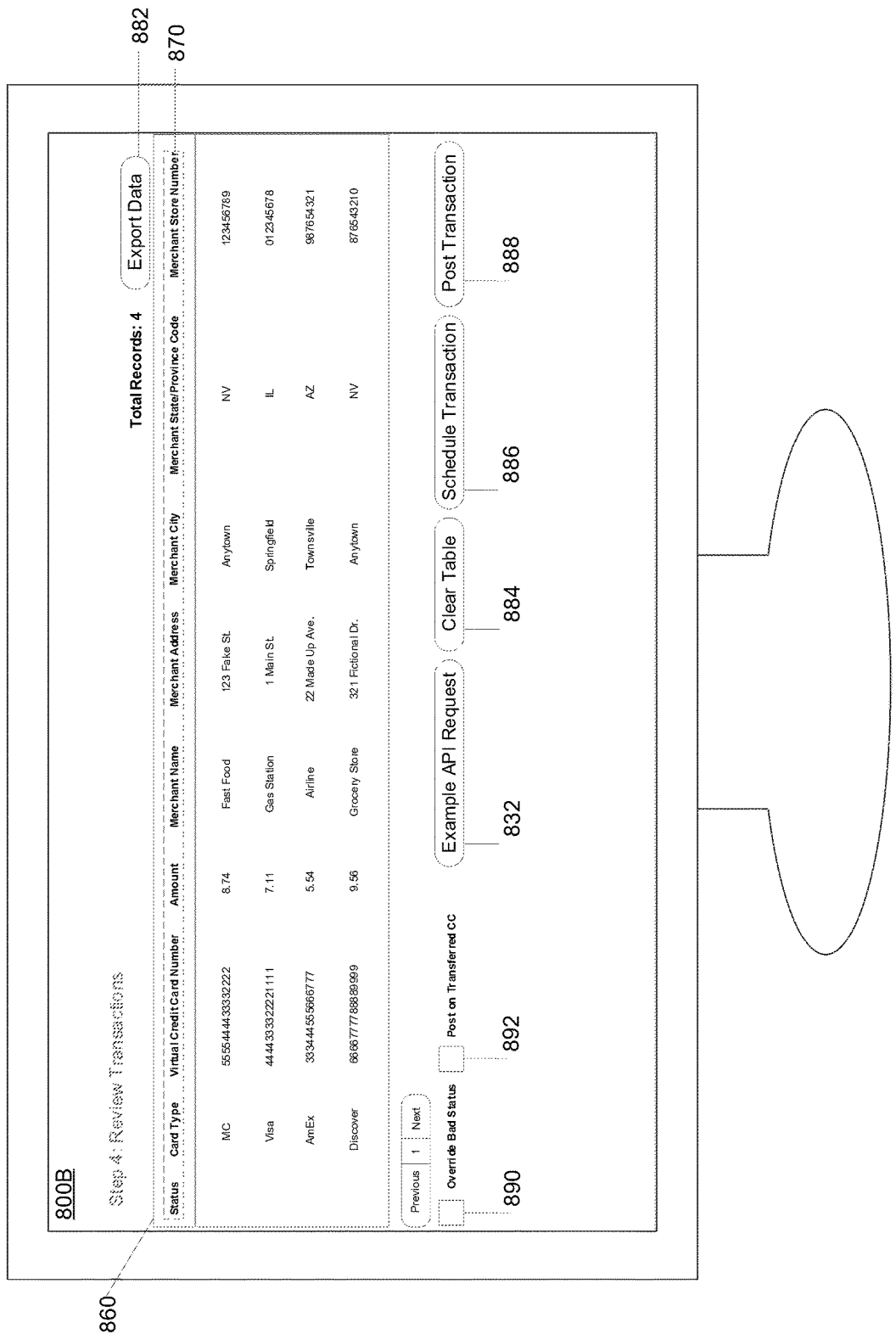

FIGS. 8A and 8B are illustrations of a user interface 800 (depicted as user interfaces 800A and 800B in the respective figures) through which settlement for a financial transaction may be generated and/or tested, according to an embodiment of the present disclosure. As depicted in FIGS. 8A and 8B, there are four steps involved in generating/testing settlement for a financial transaction, shown collectively by step buttons 810 at the top of user interface 800A. During each step, a user can modify data corresponding to various fields of information corresponding to the financial transaction for which settlement is being generated/tested.

As shown in user interface 800A of FIG. 8A, a user may be prompted to input one or more credit card numbers into entry field 820 for which the user wishes to generate a financial transaction during the first step. These credit card numbers can be existing accounts or those generated by a test account generator. By clicking (or otherwise selecting) functional button 822, the user can import financial transactions stored for the credit card number entered into entry field 820. By clicking functional button 824, the user will be taken to the next step.

At the second step, the user is prompted to enter several fields of related information 830. For example, the user may be prompted to enter a general category for the financial transaction being generated. As examples, the financial transaction may be categorized as a cash transaction, a debit card (DC) transaction, or a credit card (CC) transaction, among others. As depicted in FIG. 8A, the category selected is a general credit card transaction.

The user can also provide details corresponding to merchant type, merchant category code, and the purchase amount into fields of related information 830. As shown in FIG. 8A, a small amount ($0-$10) is selected for this particular transaction. However, as non-limiting examples, the user may also be able to select a medium purchase amount ($11-$100), a large purchase amount ($101-$499), or a very large purchase amount ($500+) for the transaction being generated/tested. Moreover, the user can enter the name of the merchant and the quantity of financial transactions to be returned in yet additional fields among the fields of related information 830.

Selecting functional button 832 may generate an example API request. The API may populate into data table 840 fields of information corresponding to completed financial transactions (described in greater detail in the ensuing discussion of the subsequent step below). Selecting functional button 834 may permit the user to find a particular transaction(s) of interest (e.g., via a search function).

At a third step of the testing process, a user may generate/populate financial transactions. Data table 840 displays to the user fields of information 850 corresponding to financial transactions completed by (e.g., pending or posted to) the credit card corresponding to the credit card number entered into entry field 820. The fields of information displayed in data table 840 are configurable, and include ID, Status, Card Type, Virtual Credit Card Number (VCCN), Amount, Merchant Name, Merchant Address, Merchant City, Merchant State/Province Code, and Merchant Store Number, among others. Configurable fields of information 850 not displayed in FIGS. 8A/8B may be taken into consideration when generating settlement for a financial transaction. Further, different combinations of these configurable fields of information than the particular combination displayed in FIGS. 8A/8B may be considered when generating settlement for a financial transaction. The fields of information 850 cannot be edited by the user as shown in this third step.

Rather, data corresponding to the fields of information 850 included in each financial transaction may be populated by the API request executed by selecting functional button 832. The user may also configure which combination of financial transactions populated into data table 840 by selecting the corresponding "Add+" button (e.g., 852(1), 852(2), 852(3), and/or 852(4), collectively "the Add buttons 852"). Alternatively, the user may select the "Add All" button 854 to add all financial transactions displayed in data table 840. Financial transactions added using the Add buttons 852 or the Add All button 854 are populated into data table 860 (to be described in the ensuing discussion of FIG. 8B). Moreover, the developer may search any transaction (e.g., for all transactions completed by a credit card having a particular VCCN) by entering the desired search criteria into the search bar found between the fields of information 850 and data table 860 and then selecting the functional button (again shown by a magnifying glass icon) to execute the search.

Turning now to FIG. 8B, the financial transactions added in the previous steps are populated into a new data table 860 at the fourth and final step. Once the financial transactions have been added to data table 860, the user can review and manually edit fields of information 870, which correspond to the financial transactions. For the purposes of testing the settlement process, the user may attempt to invalidate a generated financial transaction by modifying (e.g., by using a keyboard, mouse, etc.) any of the fields of information 870 corresponding to the transaction. As an example, all data populated into the fields of information 870 corresponding to a financial transaction included in data table 860 can be pulled via the API request executed in the second step (e.g., it came directly from the credit card provider). If the user were to modify any of the fields of information 870 corresponding to a particular financial transaction, settlement for that transaction should fail.

Again, the user may select functional button 832 to generate an example API request. The user may also select functional button 884 to clear data table 860, functional button 886 to schedule a transaction, and/or functional button 888 to post a transaction. The user may also select check box 890 to override a bad status of any of the financial transactions displayed in data table 860, or select check box 892 to post a financial transaction(s) on a transferred credit card.

In accordance with the present disclosure, selecting step buttons 810 at the top of user interface 800A of FIG. 8A, may automatically select (e.g., highlight, place a cursor in, etc.) the first field of information/entry field included in the corresponding step involved in the process of generating/testing settlement for a financial transaction. For instance, selecting the STEP 1 button may place a cursor in entry field 820 included in the first step of the settlement generation process, selecting the STEP 2 button may highlight the field of information corresponding Category included in the second step of the settlement generation process, and so on.

As a non-limiting example, a developer using an application substantially similar or identical to settlement generator 214 may be presented with a user interface 800A. Via user interface 800A, the developer may generate settlement for a financial transaction made with a credit card. The developer may click on the STEP 1 button to facilitate entering the credit card number of the card that completed the financial transaction(s) under review into entry field 820. The developer may select functional button 822 to import multiple credit card numbers, and/or the developer may select functional button 824 to proceed to the second step of the settlement generation process. Alternatively, the developer may click on the STEP 2 button to be directed to field of information corresponding to Category to begin the second step.

As illustrated in FIG. 8A, the developer selected the Category of financial transaction to be a general credit card transaction of any Merchant Type, and having any Merchant Category Code. The developer also selected financial transactions having small purchase Amounts, chose not to specify a Merchant Name, and requested to return a maximum Quantity of 20 results (e.g., corresponding financial transactions). To continue the settlement testing process, the developer may select functional button 832 to preview an example API request for the selected financial transactions. Further, the developer may choose to find a specific transaction(s) by selecting functional button 834.

Continuing with the same example, the developer may select the STEP 3 button, which may in turn place a cursor in the search bar. By typing keywords into the search bar and using the functional button denoted by a magnifying glass to execute a search for those keywords, the developer can filter through the financial transactions that are displayed in data table 840 to determine which transactions to add to a new data table for settlement testing. The developer can add financial transactions to the new data table by selecting the Add buttons 852. Alternatively, all financial transactions can be added at once by selecting the Add All button 854. In this example, the developer selected the Add All button 854 to add all four of the financial transactions to a new data table, data table 860 (as can be seen in FIG. 8B, and as will be discussed below).

To begin the fourth step, the developer may select the STEP 4 button. Once in the fourth step, the developer may edit all fields of information corresponding to the financial transactions included in the new data table 860. The ability to edit the fields of information enables the developer to test settlement for these financial transactions. Take as an example, the financial transaction completed on the credit card having VCCN 4444333322221111. If the developer were to change the Merchant Address from 1 Main St. to, say, 11 Main St., settlement for this financial transaction will fail as Gas Station #012345678 has a known, fixed address of 1 Main St., Springfield, Illinois (IL). Similarly, if the developer were to change the Merchant City from Springfield to Chicago, the Merchant State/Province Code from Illinois (IL) to Indiana (IN), the Merchant Store Number to anything other than 012345678, or the purchase Amount from $7.11 to $8.11, settlement for this financial transaction will also fail.

The developer may select functional button 832 to generate an example API request to pull/populate the fields of information 870 included in data table 860. The developer may also use functional button 884 to clear all data from data table 860. Further, the developer may use functional button 886 to schedule a transaction (e.g., a recurring transaction such as a monthly subscription). Moreover, the developer may use functional button 888 to force a financial transaction to post (as if settlement had already been generated for that particular transaction). The developer may use check box 890 to override a bad status of a financial transaction (e.g., simulate approval of a transaction that was declined) to further enable settlement testing, or the developer may use check box 892 to post a transaction on a transferred credit card (e.g., a balance transfer from an existing credit card to a new credit card). Finally, the developer may select functional button 882 to export data table 860.

Figure 9:
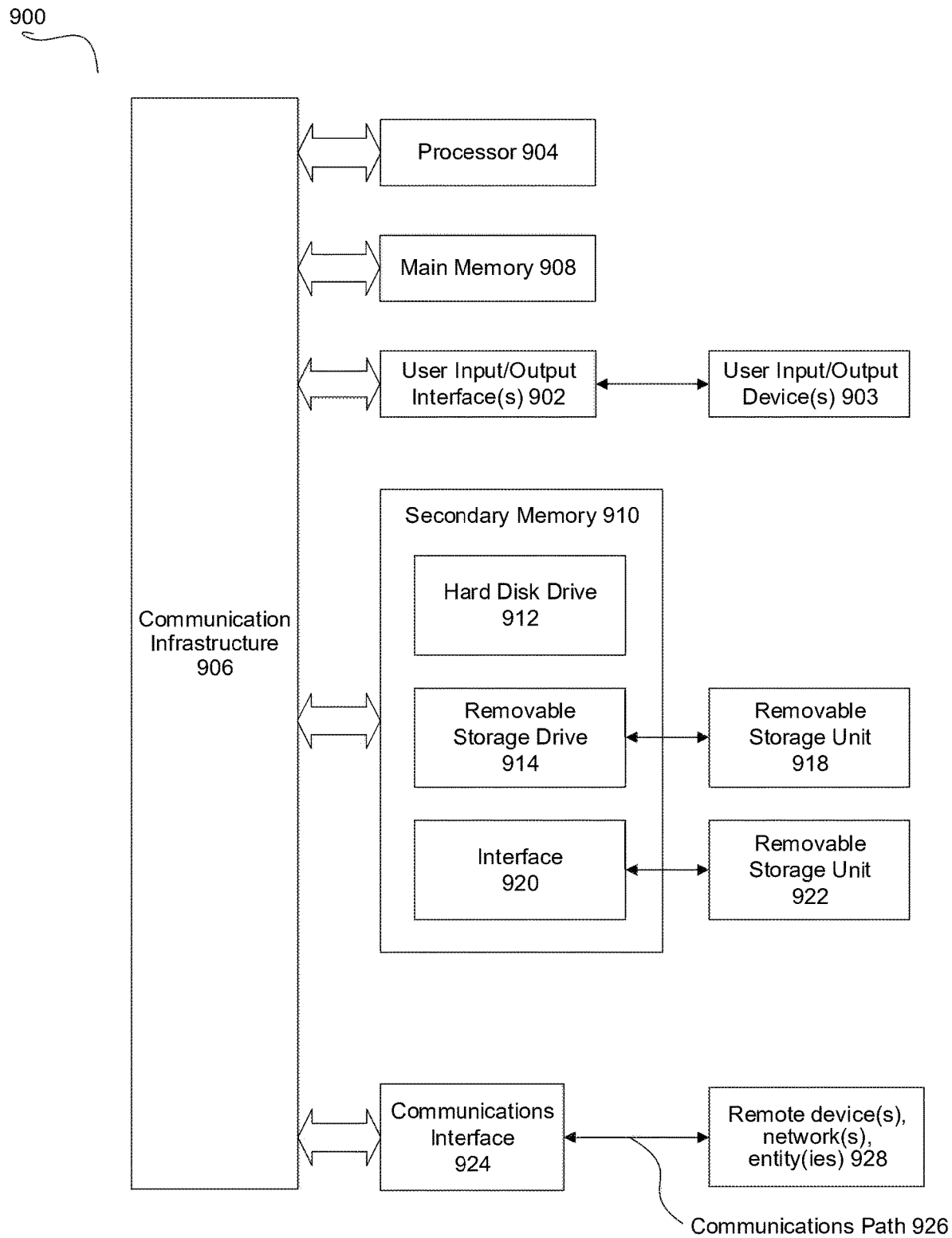
FIG. 9 is a computer system, according to an embodiment of the present disclosure.

FIG. 9 depicts an example computer system useful for implementing various embodiments. Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data. Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A method of generating test authorization for financial transactions, the method comprising:

executing, by one or more computing devices, an application programming interface (API) call to pull a plurality of financial transactions from a financial institution;

generating an initial data set corresponding to a financial transaction of the plurality of financial transactions, the initial data set including one or more fields of information of the financial transaction;

displaying the initial data set of the financial transaction in a user interface, wherein the user interface displays the one or more fields of information of the initial data set of the financial transaction as human-readable objects that are configurable by a user;

receiving an instruction from the user via the user interface to alter a field of the one or more fields of information of the initial data set of the financial transaction displayed on the user interface;

generating a test data set comprising the initial data set and the altered field of the one or more fields of information in the initial data set, wherein the test data set is in a configurable format;

transmitting the test data set to an orchestrator, wherein the orchestrator is configured to convert the test data set to a binary file and transmit the binary file to a message broker;

receiving the binary file from the message broker;

deserializing the binary file into a deserialized test data set; and generating a transaction file for the financial transaction using the deserialized test data set, wherein the transaction file is formatted to conform to specifications of a third party processor configured to receive the test data set.

2. The method of claim 1, wherein the initial data set corresponding to the financial transaction simulates consumer purchases, including a purchase amount, a vendor, associated vendor information, a date of purchase, a time of purchase, or other simulated transaction details.

3. The method of claim 1, wherein the altered field of the one or more fields of information comprises at least one of an account number, a type of account, activation status, account activation codes, variables related to account activation code validity, merchant codes, or any combination thereof.

4. The method of claim 1, further comprising initializing a scheduling process configured to transmit the transaction file to the third party processor.

5. The method of claim 1, wherein the transaction file is in a configurable format.

6. A non-transitory computer-readable storage medium having a set of computer-executable instructions embodied thereon, execution of which, by one or more processing devices, causes the one or more processing devices to perform operations for generating test authorization for financial transactions, the operations comprising:

executing, by the one or more processing devices, an application programming interface (API) call to pull a plurality of financial transactions from a financial institution;

generating an initial data set corresponding to a financial transaction of the plurality of financial transactions, the initial data set including one or more fields of information of the financial transaction;

displaying the initial data set of the financial transaction in a user interface, wherein the user interface displays the one or more fields of information of the initial data set of the financial transaction as human-readable objects that are configurable by a user;

receiving an instruction from the user via the user interface to alter a field of the one or more fields of information of the initial data set of the financial transaction displayed on the user interface;

generating a test data set comprising the initial data set and the altered field of the one or more fields of information in the initial data set, wherein the test data set is in a configurable format;

transmitting the test data set to an orchestrator, wherein the orchestrator is configured to convert the test data set to a binary file and transmit the binary file to a message broker;

receiving the binary file from the message broker;

deserializing the binary file into a deserialized test data set; and generating a transaction file for the financial transaction using the deserialized test data set, wherein the transaction file is formatted to conform to specifications of a third party processor configured to receive the test data set.

7. The non-transitory computer-readable storage medium of claim 6, wherein the initial data set corresponding to the financial transaction simulates consumer purchases, including a purchase amount, a vendor, associated vendor information, a date of purchase, a time of purchase, or other simulated transaction details.

8. The non-transitory computer-readable storage medium of claim 6, wherein the altered field of the one or more fields of information comprises at least one of an account number, a type of account, activation status, account activation codes, variables related to account activation code validity, merchant codes, or any combination thereof.

9. The non-transitory computer-readable storage medium of claim 6, the operations further comprising initializing a scheduling process configured to transmit the transaction file to the third party processor.

10. The non-transitory computer-readable storage medium of claim 6, wherein the transaction file is in a configurable format.

11. A system comprising:

a memory configured to store a set of computer-executable operations; and one or more processors configured to perform the operations comprising:

executing, by one or more computing devices, an application programming interface (API) call to pull a plurality of financial transactions from a financial institution;

generating an initial data set corresponding to a financial transaction of the plurality of financial transactions, the initial data set including one or more fields of information of the financial transaction;

displaying the initial data set of the financial transaction in a user interface, wherein the user interface displays the one or more fields of information of the initial data set of the financial transaction as human-readable objects that are configurable by a user;

receiving an instruction from the user via the user interface to alter a field of the one or more fields of information of the initial data set of the financial transaction displayed on the user interface;

generating a test data set comprising the initial data set and the altered field of the one or more fields of information in the initial data set, wherein the test data set is in a configurable format;

transmitting the test data set to an orchestrator, wherein the orchestrator is configured to convert the test data set to a binary file and transmit the binary file to a message broker;

receiving the binary file from the message broker;

deserializing the binary file into a deserialized test data set; and generating a transaction file for the financial transaction using the deserialized test data set, wherein the transaction file is formatted to conform to specifications of a third party processor configured to receive the test data set.

12. The system of claim 11, wherein the initial data set corresponding to the financial transaction simulates consumer purchases, including a purchase amount, a vendor, associated vendor information, a date of purchase, a time of purchase, or other simulated transaction details.

13. The system of claim 11, wherein the user interface enables importing data, exporting data, executing example API requests, adding financial transactions, modifying financial transactions, scheduling transactions, or a combination thereof.

14. The system of claim 11, wherein the altered field of the one or more fields of information comprises at least one of an account number, a type of account, activation status, account activation codes, variables related to account activation code validity, merchant codes, or any combination thereof.

15. The system of claim 11, wherein the operations further comprise initializing a scheduling process configured to transmit the transaction file to the third party processor.

16. The system of claim 11, wherein the transaction file is in a configurable format.

17. The method of claim 1, further comprising:
generating an authorization for the transaction file by transmitting the transaction file to a verification entity.

18. The non-transitory computer-readable storage medium of claim 6, the operations further comprising:
generating an authorization for the transaction file by transmitting the transaction file to a verification entity.

19. The system of claim 11, wherein the operations further comprise:
generating an authorization for the transaction file by transmitting the transaction file to a verification entity.

* * * * *